(12) United States Patent
Weitzner et al.

(10) Patent No.: US 8,167,208 B2
(45) Date of Patent: May 1, 2012

(54) ARRANGEMENT FOR AND METHOD OF CONTROLLING MONITOR PHOTODIODE LEAKAGE CURRENT IN LASERS IN ELECTRO-OPTICAL READERS

(75) Inventors: Mark Weitzner, Plainview, NY (US); James Giebel, Centerport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 199 days.

(21) Appl. No.: 12/821,436

(22) Filed: Jun. 23, 2010

(65) Prior Publication Data
US 2011/0315771 A1 Dec. 29, 2011

(51) Int. Cl.
G06K 7/10 (2006.01)
G08C 21/00 (2006.01)
H01S 3/00 (2006.01)

(52) U.S. Cl. ............... 235/455; 235/462.01; 235/462.06; 372/38.02

(58) Field of Classification Search ............. 235/462.01, 235/462.06, 454, 455, 439; 250/205, 214 R; 372/38.01, 38.02, 38.07, 29.011, 29.015, 372/29.02
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 4,989,214 A * | 1/1991 | Kwa | 372/50.21 |
| 5,304,786 A | 4/1994 | Pavlidis et al. | |
| 5,625,483 A * | 4/1997 | Swartz | 359/224.1 |
| 5,703,349 A | 12/1997 | Meyerson et al. | |
| 5,821,527 A * | 10/1998 | Rudd et al. | 250/205 |
| 6,705,525 B2 * | 3/2004 | Krichever et al. | 235/462.32 |
| 7,255,275 B2 * | 8/2007 | Gurevich et al. | 235/455 |
| 7,267,283 B2 * | 9/2007 | Schneider et al. | 235/472.01 |
| 7,296,743 B2 * | 11/2007 | Giebel et al. | 235/454 |
| 7,414,653 B2 * | 8/2008 | Fowler et al. | 348/308 |
| 7,743,989 B2 * | 6/2010 | Gurevich et al. | 235/455 |
| 7,963,447 B2 * | 6/2011 | Yu et al. | 235/462.43 |
| 2006/0285563 A1 * | 12/2006 | Hakomori | 372/38.01 |
| 2007/0030868 A1 * | 2/2007 | Sekigawa | 372/29.015 |
| 2007/0133633 A1 * | 6/2007 | Difazio et al. | 372/38.02 |
| 2007/0280314 A1 * | 12/2007 | Keh et al. | 372/38.02 |
| 2010/0158055 A1 * | 6/2010 | Giebel | 372/29.011 |

* cited by examiner

Primary Examiner — Michael G Lee
Assistant Examiner — Suezu Ellis
(74) Attorney, Agent, or Firm — Nong-Qiang Fan (57) ABSTRACT

In an electro-optical reader, an aiming or a scanning laser has an internal laser chip and a monitor photodiode. A controller deenergizes the chip in a deenergized state, and energizes the chip to emit a laser beam with an output power in an energized state. A positive voltage power supply forward biases and maintains the photodiode at a substantially constant positive voltage below a threshold voltage, to support a substantially constant photodiode leakage current in both states. A signal processor supports a total current comprised of a main photodiode current indicative of the output power of the laser beam in the energized state and of the leakage current which flows opposite to the main current, and removes the leakage current from the total current to output only the main current in the energized state.

17 Claims, 5 Drawing Sheets

ARRANGEMENT FOR AND METHOD OF CONTROLLING MONITOR PHOTODIODE LEAKAGE CURRENT IN LASERS IN ELECTRO-OPTICAL READERS

BACKGROUND OF THE INVENTION

Moving laser beam readers or laser scanners, as well as solid-state imaging systems or imaging readers, have both been used to electro-optically read one-dimensional bar code symbols, particularly of the Universal Product Code (UPC) type, each having a row of bars and spaces spaced apart along one direction, and two-dimensional symbols, such as Code 49, which introduced the concept of vertically stacking a plurality of rows of bar and space patterns in a single symbol, as described in U.S. Pat. No. 4,794,239. Another two-dimensional code structure for increasing the amount of data that can be represented or stored on a given amount of surface area is known as PDF417 and is described in U.S. Pat. No. 5,304,786.

Moving laser beam readers generally include a laser for emitting a laser beam, a focusing lens assembly for focusing the laser beam to form a beam spot having a certain size at a focal plane in a range of working distances, a scan component for repetitively scanning the beam spot across a target symbol in a scan pattern, for example, a scan line or a series of scan lines, across the symbol multiple times per second, e.g., forty times per second, a photodetector for detecting laser light reflected and/or scattered from the symbol and for converting the detected laser light into an analog electrical signal, and signal processing circuitry including a digitizer for digitizing the analog signal, and a microprocessor for decoding the digitized signal based upon a specific symbology used for the symbol.

The imaging reader includes a solid-state imager or sensor having an array of cells or photosensors that correspond to image elements or pixels in a field of view of the imager, an aiming light assembly having an aiming light source, e.g., an aiming laser, and an aiming lens for generating an aiming light pattern or mark on a target symbol prior to reading, an illuminating light assembly for illuminating the field of view with illumination light from an illumination light source, e.g., one or more light emitting diodes (LEDs), and an imaging lens assembly for capturing return ambient and/or illumination light scattered and/or reflected from the symbol being imaged over a range of working distances and for projecting the captured light onto the array. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

As advantageous as both types of electro-optical readers are in reading symbols, it is always desirable to enhance performance. Increasing the intensity or brightness of the laser beam of the laser in the moving laser beam reader will increase the working distance range, because there will be correspondingly more return light to detect from symbols that are further away from the moving laser beam reader. Similarly, increasing the intensity or brightness of the aiming laser in the imaging reader will increase performance, because the aiming pattern will be more visible to an operator, especially for symbols that are further away from the imaging reader.

However, increasing the laser beam intensity too much for either the laser in the moving beam reader or the aiming laser in the imaging reader may violate human eye exposure laser safety standard limits. For example, a class 2 laser is limited to an output power of 1 mW over a base time interval of 250 msec, and a class 1 laser is limited to an output power of 0.39 mW over a base time interval of 10 sec. The laser beam intensity cannot exceed these limits not only in normal operation, but also in the event of reader malfunction or failure of laser power control circuitry specifically provided in each reader to insure that these limits are never surpassed.

The known laser power control circuitry in such readers monitors the laser current in order to provide feedback about the output power of the laser beam. Also, an internal light detector, e.g., a semiconductor monitor photodiode, is typically mounted inside the laser adjacent a semiconductor laser chip, for monitoring the output power of the laser beam. A controller is operatively connected to the monitor photodiode, for controlling a monitored output power of the laser beam by deenergizing the laser when the monitored output power of the laser beam exceeds a safe power level limit.

As advantageous as the use of the monitor photodiode has been in monitoring laser power, recent changes in the manufacture of such lasers to decrease their cost have hindered their continued ready use in existing electro-optical readers. Heretofore, the cathode of the laser chip and the anode of the monitor photodiode were both grounded, thereby enabling the monitor photodiode to be reverse biased with a positive power supply readily on hand in such electro-optical readers. However, the recent manufacturing changes to reduce cost and to accommodate the use of such lasers in other industries, e.g., the digital video recording industry, have resulted in the cathodes of the laser chip and of the monitor photodiode to both be grounded. Now, in order to reverse bias the monitor photodiode to operate in a photoconductive mode, a negative power supply is needed, but it is not available in existing electro-optical readers.

Without a means to reverse bias the monitor photodiode, one might attempt to operate the monitor photodiode in a photovoltaic mode, i.e., without any external bias whatsoever. However, light incident on the monitor photodiode would then produce an unpredictable positive bias voltage across the monitor photodiode, as well as an unpredictable photodiode leakage current to flow through the monitor photodiode in opposition to a main photodiode current representative of the monitored output power of the laser beam. The photodiode leakage current corrupts the main photodiode current, and is also temperature-dependent.

Accordingly, there is a need for being able to take advantage of the low cost benefit of lasers in current manufacture, and to obtain them from multiple sources, even from other industries, and to use them in electro-optical readers without corrupting the main photodiode current representative of the monitored output power of the laser beam by the presence of photodiode leakage current.

SUMMARY OF THE INVENTION

The present invention generally relates to an electro-optical reader for reading indicia, such as bar code symbols, which employs an energizable laser for emitting a laser beam. In the case of a moving laser beam reader, the laser is a scanning laser, and the laser beam is scanned across the indicia during reading. In the case of an imaging reader, the laser is an aiming laser, and the laser beam is directed in an aiming pattern at the indicia prior to reading.

One feature of this invention resides, briefly stated, in an arrangement for controlling such a laser that has an internal semiconductor laser chip and an internal semiconductor monitor photodiode. The arrangement includes a controller for deenergizing the laser chip in a deenergized state, and for energizing the laser chip to emit a laser beam with an output power in an energized state. A positive voltage power supply is connected to an anode of the monitor photodiode, for forward biasing the monitor photodiode at a substantially constant positive voltage below a threshold voltage of the monitor photodiode. The substantially constant positive voltage is maintained at the anode to support a substantially constant photodiode leakage current in both states.

The arrangement further includes a signal processor for supporting a total current comprised of a main photodiode current indicative of the output power of the laser beam in the energized state and of the substantially constant photodiode leakage current which flows opposite to the main photodiode current, and for removing the substantially constant photodiode leakage current from the total current to output only the main photodiode current in the energized state. Thus, corruption of the main photodiode current caused by the photodiode leakage current is obviated. Low cost lasers in current manufacture from multiple sources, even from other industries, can now be used.

In a preferred embodiment, the positive voltage power supply includes an input operational amplifier and a metal oxide semiconductor field-effect transistor (MOSFET). The signal processor includes a track-and-hold circuit for holding a held current indicative of the photodiode leakage current in the energized state The track-and-hold circuit preferably includes a switch under control of the controller and switchable between a hold mode in which the switch is closed in the deenergized state, and a track mode in which the switch is open in the energized state. The track-and-hold circuit also preferably includes a capacitor for holding the held current in the track mode.

The signal processor advantageously includes a plurality of current mirrors each operative for generating the total current. An output operational amplifier configured as a transimpedance amplifier may be employed for converting the main photodiode current to an output voltage. This output voltage may then be used for controlling the laser.

Another feature of this invention resides in a method of controlling a laser that has an internal semiconductor laser chip and an internal semiconductor monitor photodiode, in an electro-optical reader for reading indicia. The method is performed by deenergizing the laser chip in a deenergized state; energizing the laser chip to emit a laser beam with an output power in an energized state; forward biasing the monitor photodiode at a substantially constant positive voltage below a threshold voltage of the monitor photodiode by connecting a positive voltage to an anode of the monitor photodiode, and maintaining said substantially constant positive voltage at the anode to support a substantially constant photodiode leakage current in both states; supporting a total current comprised of a main photodiode current indicative of the output power of the laser beam in the energized state and of the substantially constant photodiode leakage current which flows opposite to the main photodiode current; and removing the substantially constant photodiode leakage current from the total current to output only the main photodiode current in the energized state.

Thus, the present invention intentionally places a fixed voltage bias across the monitor photodiode and holds the photodiode leakage current substantially constant, even in the presence of incident light. The photodiode leakage current is then removed by the signal processor.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

As used herein, the term "indicia" broadly encompasses not only symbol patterns composed of alternating bars and spaces of various widths as commonly referred to as bar code symbols, but also other one- or two-dimensional graphic patterns, as well as alphanumeric characters. In general, the term "indicia" may apply to any type of pattern or characters, which may be recognized or identified either by scanning a light beam and detecting reflected or scattered light as a representation of variations in light reflectivity at various points of the pattern or characters, or by capturing ambient and/or illumination light from the pattern or characters to form an image to be decoded.

Figure 1:
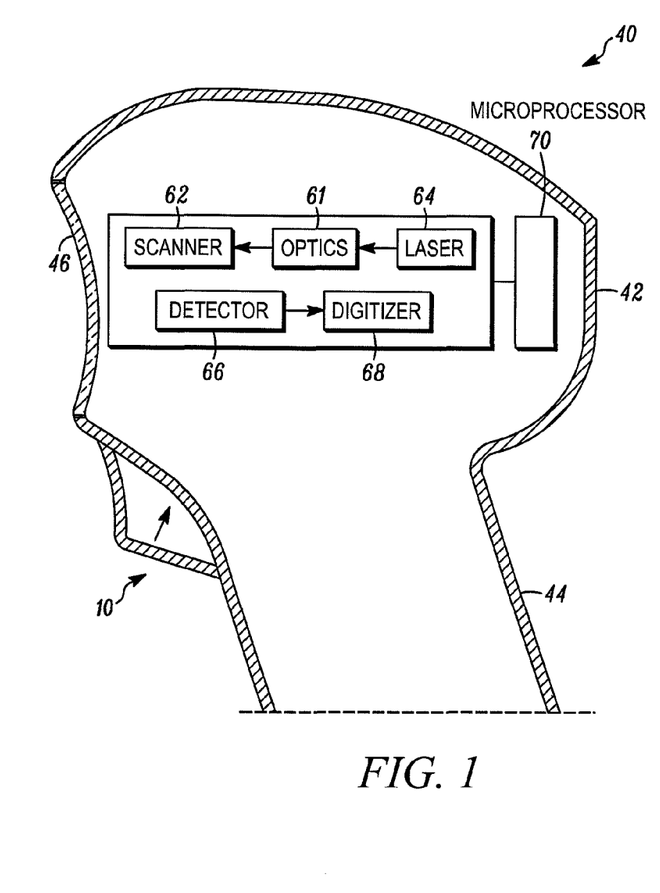
FIG. 1 is a schematic diagram of a handheld moving laser beam reader for electro-optically reading indicia that can benefit from the present invention.

FIG. 1 depicts a moving laser beam reader 40 for electro-optically reading a target or indicia, such as a symbol, that may use, and benefit from, the present invention. The beam reader 40 includes a scanner 62 in a handheld housing 42 having a handle 44 on which a trigger 10 for initiating reading is mounted. The scanner 62 is operative for scanning an outgoing laser beam from a laser 64 and/or a field of view of a light detector or photodiode 66 in a scan pattern, typically comprised of one or more scan lines, multiple times per second, for example, forty times per second, through a window 46 across the symbol for reflection or scattering therefrom as return light detected by the photodiode 66 during reading. The beam reader 40 also includes a focusing lens assembly or optics 61 for optically modifying the outgoing laser beam to have a large depth of field, and a digitizer 68 for converting an electrical analog signal generated by the detector 66 from the return light into a digital signal for subsequent decoding by a microprocessor or controller 70 into data indicative of the symbol being read.

Figure 2:
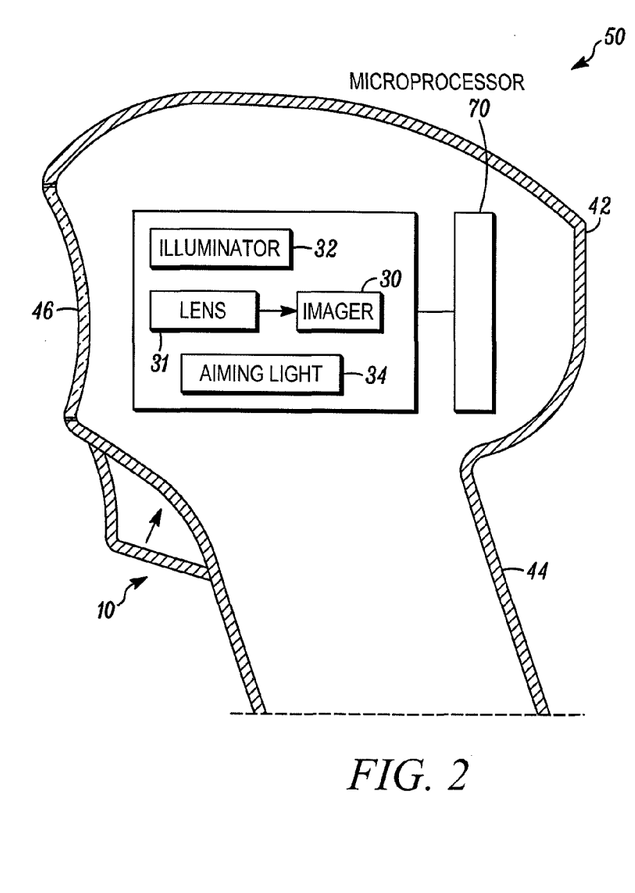
FIG. 2 is a schematic diagram of a handheld imaging reader for electro-optically reading indicia that can benefit from the present invention.

FIG. 2 depicts an imaging reader 50 for imaging targets, such as indicia or symbols to be electro-optically read, as well as non-symbols, which may use, and benefit from, the present invention. The imaging reader 50 includes a one- or two-dimensional, solid-state imager 30, preferably a CCD or a CMOS array, mounted in the handheld housing 42 having the handle 44 on which the trigger 10 for initiating reading is mounted. The imager 30 has an array of image sensors operative, together with an imaging lens assembly 31, for capturing return light reflected and/or scattered from the target through the window 46 during the imaging and for projecting the captured light onto the imager 30, to produce an electrical signal indicative of a captured image for subsequent decoding by the controller 70 into data indicative of the symbol being read, or into a picture of the target.

When the reader 50 is operated in low light or dark ambient environments, the imaging reader 50 includes an illuminator 32 for illuminating the target during the imaging with illumination light directed from an illumination light source through the window 46. Thus, the return light may be derived from the illumination light and/or ambient light. The illumination light source comprises one or more light emitting diodes (LEDs). An aiming light generator including an aiming laser 34 may also be provided for projecting an aiming light pattern or mark on the target prior to imaging.

In operation of the imaging reader 50, the controller 70 sends command signals to drive the aiming laser 34 to project the aiming pattern on the target prior to reading, and then to drive the illuminator LEDs 32 for a short time period, say 500 microseconds or less, and to energize the imager 30 during an exposure time period of a frame to collect light from the target during said time period. A typical array needs about 16-33 milliseconds to read the entire target image and operates at a frame rate of about 30-60 frames per second. The array may have on the order of one million addressable image sensors.

Figure 3:
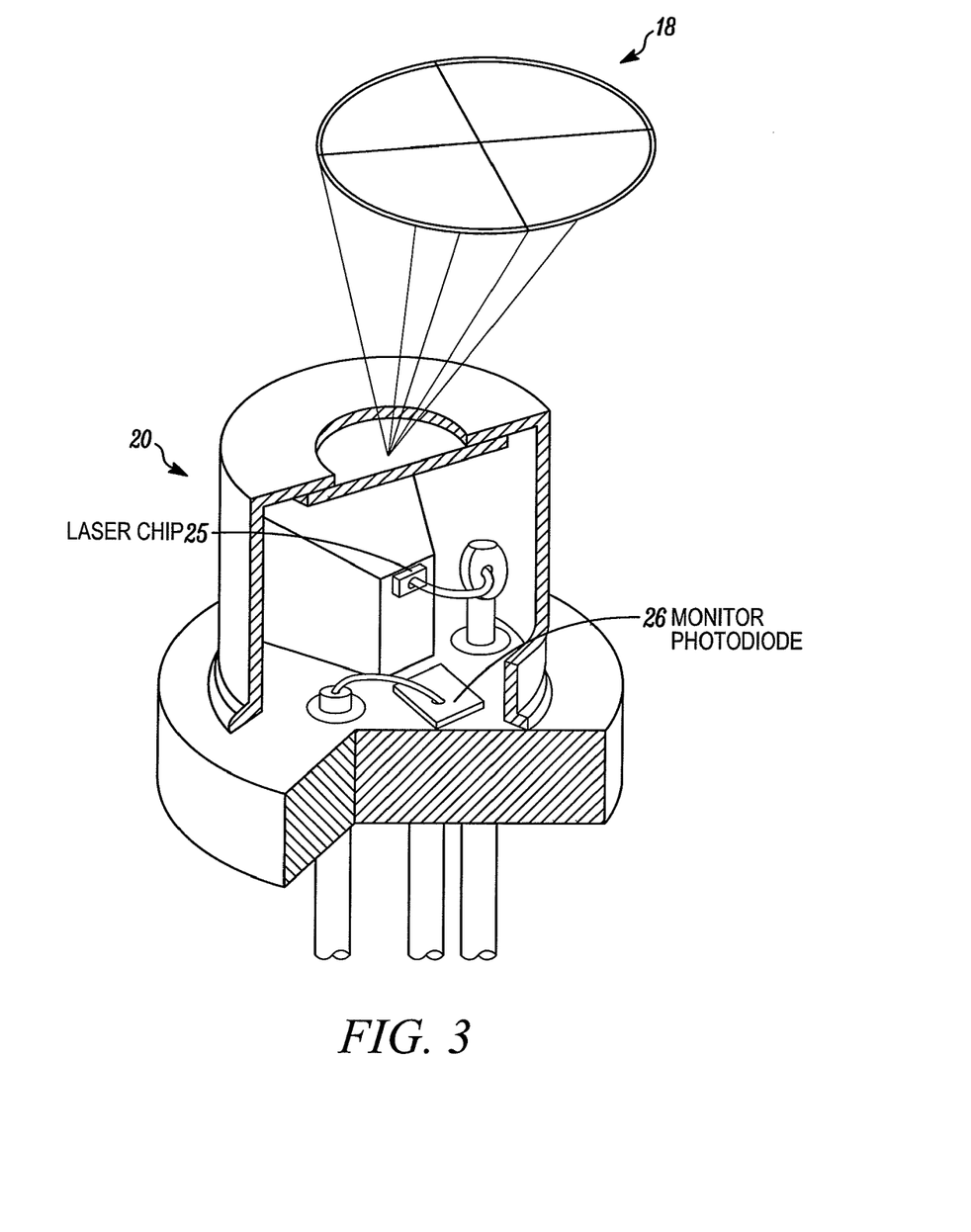
FIG. 3 is a broken-away, perspective view of a laser for use in the readers of FIG. 1 or 2 that can benefit from the present invention.

The laser 64, as shown in FIG. 1, or the aiming laser 34, as shown in FIG. 2, is depicted in isolation in FIG. 3 as a packaged semiconductor laser 20 that includes an internal laser diode or chip 25 for emitting a laser beam having an output power, and an internal monitor detector or photodiode 26 operative for monitoring the output power of the laser beam of the chip 25. FIG. 3 also shows that the emitted laser beam has an elongated, elliptical, or oval cross-section 18.

Figure 4:
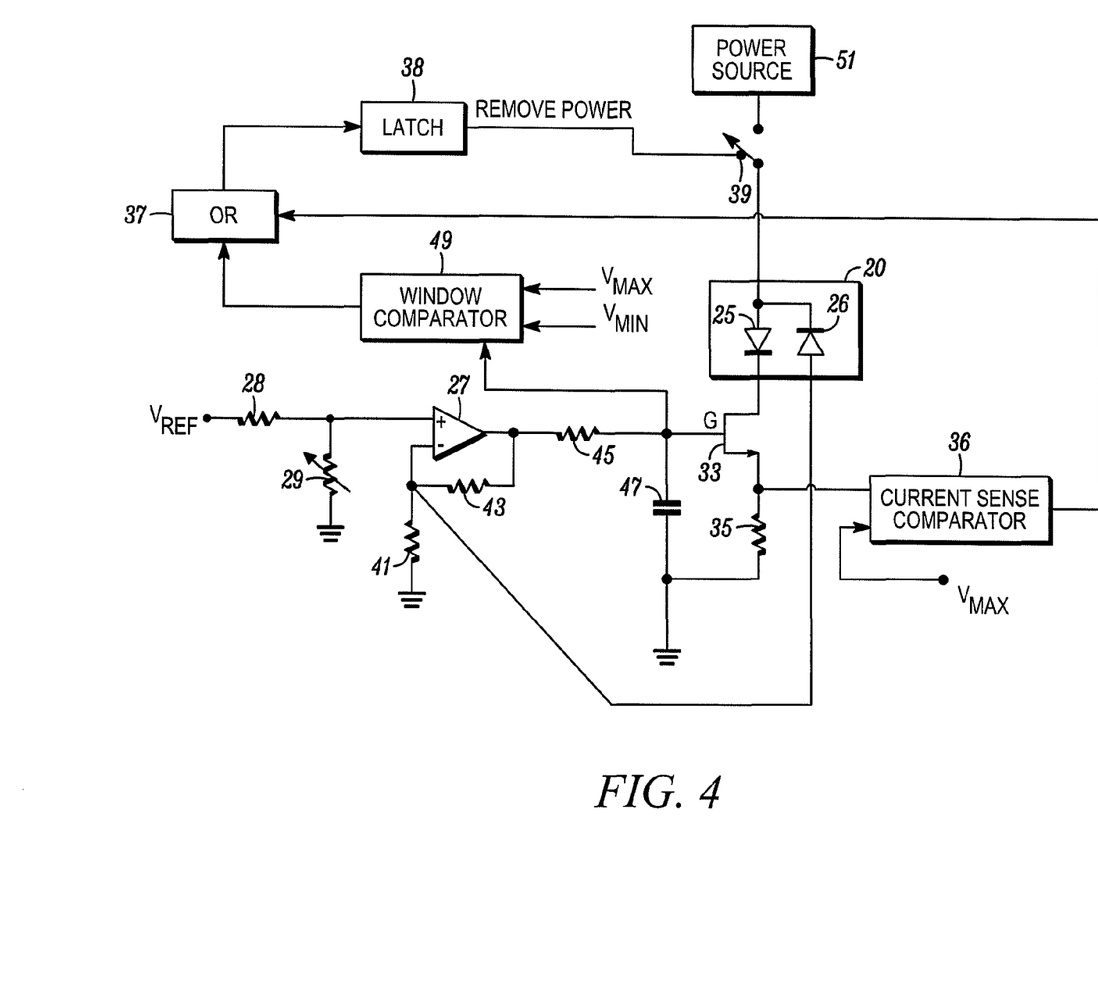
FIG. 4 is a circuit schematic view of the laser of FIG. 3 employed in a laser power control arrangement.

As shown in the circuit of FIG. 4, the monitor photodiode 26 of the laser 20 is operative for monitoring the output power of the chip 25, and is part of a feedback circuit operative for maintaining the laser output power constant. The feedback circuit of FIG. 4 is conventional and includes an operational amplifier 27 having a reference voltage applied to a positive input of the amplifier through a voltage divider comprised of resistors 28, 29. The monitor photodiode 26 is connected to a negative input of the comparator via a resistive network including resistors 41, 43. The output of the amplifier 27 is conducted through a resistor 45 and capacitor 47 to a gate G of a field effect transistor (FET) 33. The drain output of the FET 33 is connected to the laser chip 25. The source output of the device 33 is connected to ground through a current sense resistor 35.

The monitor photodiode 26 detects changes in output power of the laser beam emitted by laser chip 25 and sends a feedback signal to the amplifier 27 for driving the FET 33 to allow more or less current to pass through the current sense resistor 35 and, in turn, through the laser chip 25. The greater this current, the greater the laser output power, and vice versa.

In accordance with FIG. 4, a current sense comparator 36 has one input connected to the current sense resistor 35 to monitor the current flowing therethrough, and another input connected to a reference voltage that corresponds to the maximum current allowable through the resistor 35. The output of the comparator 36 is connected to an OR gate 37 which, in turn, is connected to a latch 38 and a switch 39, which is connected between a power supply 51 and the laser diode 25. If the comparator 36 senses that the current passing through the resistor 35 exceeds a maximum preestablished value, then an output control signal is conducted to the gate 37 and, in turn, to the latch 38 for opening the switch 39 to remove the power source 51 from energizing the laser chip 25.

In further accordance with FIG. 4, a window comparator 49 is connected to the resistor 45 and monitors the voltage being applied to the gate G of the FET 33. A maximum gate voltage and a minimum gate voltage are also applied to the window comparator 49, preferably under the control of the controller 70. The comparator 49 is, in turn, connected to the OR gate 37. If the comparator 49 senses that the gate voltage being applied to the gate G is greater than the preestablished maximum gate voltage, or is less than the preestablished minimum gate voltage, then a signal is sent to the OR gate 37 to operate the latch 38 and open the switch 39, thereby deenergizing the laser diode. Thus, power is removed from the laser chip 25 in the event of malfunction or failure of the monitor photodiode 26, the FET 33, the amplifier 27, the laser chip 25, or any circuit connection.

As previously explained, recent changes in the manufacture of such lasers 20 to reduce their cost have hindered their continued ready use in existing electro-optical readers 40, 50. Thus, the cathodes of the laser chip 25 and of the monitor photodiode 26 are now both grounded. In order to reverse bias the monitor photodiode 26 to operate in the photoconductive mode, a negative power supply is needed, but it is not available in existing electro-optical readers 40, 50. Without a means to reverse bias the monitor photodiode, operating the monitor photodiode in the photovoltaic mode, as described above, would produce an unpredictable positive bias voltage across the monitor photodiode, as well as an unpredictable photodiode leakage current to flow through the monitor photodiode in opposition to a main photodiode current representative of the monitored output power of the laser beam. The photodiode leakage current corrupts the main photodiode current, and is also temperature-dependent.

Figure 5:
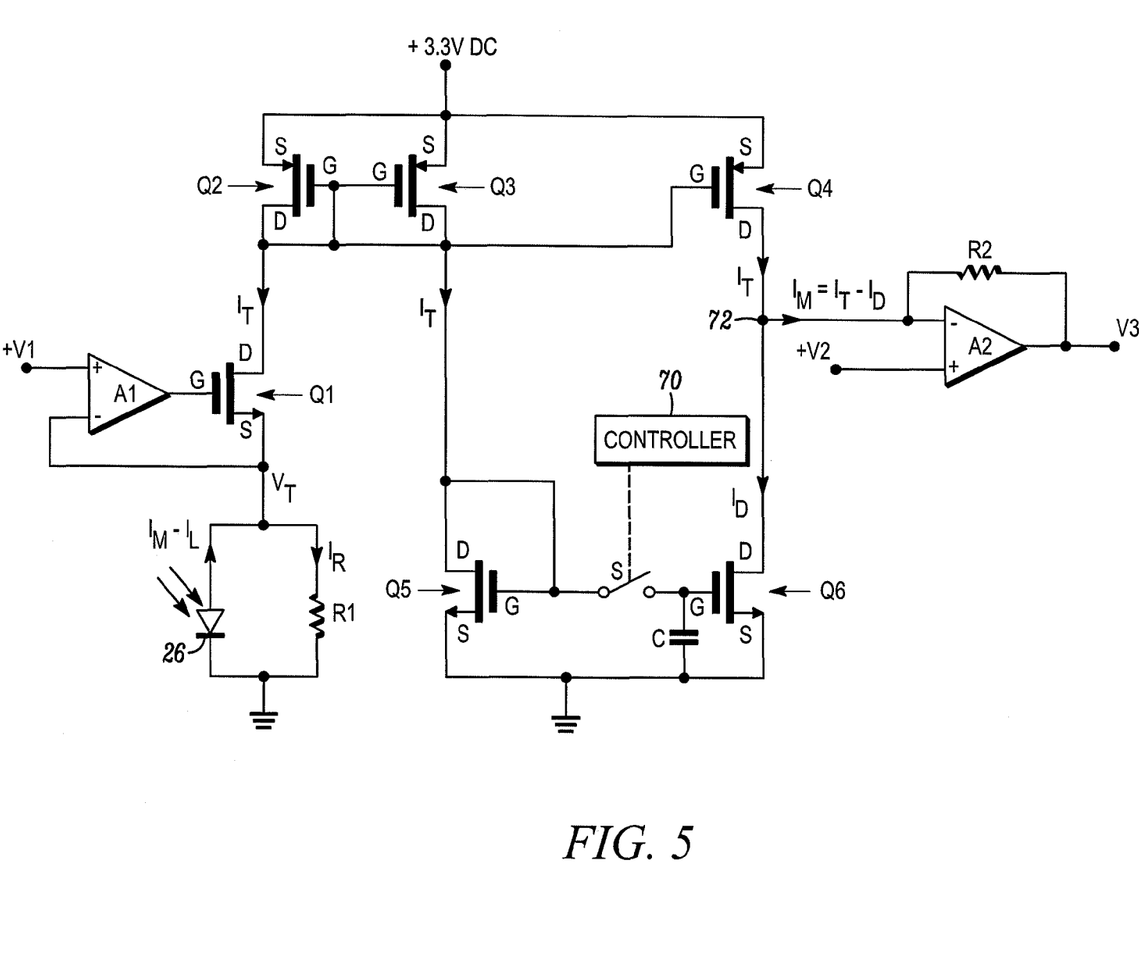
FIG. 5 is an electrical circuit schematic of one embodiment of an arrangement and method of controlling the laser of FIG. 3 in accordance with the present invention.

Thus, in accordance with this invention, as shown in the embodiment of FIG. 5, a positive voltage power supply is connected to an anode of the monitor photodiode 26, for forward biasing the monitor photodiode 26 at a substantially constant positive voltage $V_T$, e.g., about 400 millivolts, below a threshold voltage, e.g., about 700 millivolts, of the monitor photodiode 26. The positive voltage power supply includes an operational amplifier A1 having a positive voltage V1 applied to its positive input, and an n-type MOSFET Q1 whose gate is connected to an output of the amplifier A1, and whose source is connected to the negative input of the amplifier A1 and to the anode of the monitor photodiode 26. The forwardly biased monitor photodiode 26 monitors the output power of the emitted laser beam of the laser chip 25 when energized to an energized state by the controller 70. Of course, no laser beam is emitted when the laser chip 25 is not energized to a deenergized state by the controller 70.

A load resistor R1 is depicted in FIG. 5 across the monitor photodiode 26. A load current $I_R$ passes through the load resistor R1. The value of the load resistor is chosen to guarantee that the positive voltage $V_T$ does not exceed the positive voltage V1, thereby insuring that the MOSFET Q1 is always turned on over the expected range of the main photodiode current that the monitor photodiode 26 can produce. The value of the load resistor and of the positive voltage $V_T$ are provided to support the maximum expected value of the main photodiode current. For simplicity, in the following analysis, $I_R$ is assumed to be zero. The substantially constant positive voltage $V_T$ is maintained at the anode to support a substantially constant photodiode leakage current $I_L$ in both states.

The arrangement further includes a signal processor or processing circuit for supporting a total current $I_T$ comprised of a main photodiode current $I_M$ indicative of the output power of the laser beam in the energized state and of the substantially constant photodiode leakage current $I_L$ which flows opposite to the main photodiode current $I_M$. Expressed mathematically: $I_T = -I_M + I_L$ (with $I_R = 0$). As explained in detail below, the signal processing circuit is operative for removing the substantially constant photodiode leakage current $I_L$ from the total current $I_T$ to output only the main photodiode current $I_M$ in the energized state.

The signal processor includes a plurality of MOSFETS Q2, Q3 and Q4 which mirror the total current $I_T$. A track-and-hold circuit including a switch S and a capacitor C is connected between another pair of MOSFETS Q5 and Q6. In the deenergized state, the switch S is closed in a track mode of operation. In the energized state, the switch S is open in a hold mode of operation. The current that passes through the MOSFET Q6 is denoted as $I_D$ in FIG. 5.

Thus, in the track mode, the gates of Q5 and Q6 are tied together; the capacitor C is charged by the total current $I_T$; and the current $I_D$ passing through the MOSFET Q6 is the same as the current $I_T$ passing through the MOSFET Q5. Since the laser chip 25 is deenergized in the track mode, $I_M = 0$, and therefore, $I_T = +I_L$. Since $I_T = I_D$, this means that $I_D = +I_L$. In other words, $I_T$ and $I_D$ counterbalance each other at junction 72 of the signal processing circuit, and the current $I_D$ that passes through the MOSFET Q6 is proportional to the leakage current $I_L$. An output operational amplifier A2 has its negative input connected to junction 72, and its positive input connected to a positive reference voltage V2. A resistor R2 is connected between the negative input and the output of the amplifier A2 to configure the same as a transimpedance amplifier. The amplifier A2 converts the current at its negative input to an output voltage V3. In this case, since there is no current at its negative input, the output voltage V3 is equal to the reference voltage V2, which corresponds to a zero signal state of the amplifier's output.

Thereupon, in the hold mode, the switch S is opened, the laser chip 25 is energized, and the capacitor C retains the last instantaneous voltage that it held or sampled. As before, $I_T = -I_M + I_L$. Since $I_D = +I_L$, then $I_D - I_T = -I_M$, or $I_M = I_T - I_D$. At the junction 72, the signal processing circuit has removed the leakage current $I_L$ by subtracting the held current $I_D$ from the total current $I_T$. Only the main photodiode current $I_M$ is applied to the negative input of the amplifier A2.

In other words, the undesirable photodiode leakage current $I_L$ is sampled and held by the track-and-hold circuit before the laser chip 25 is turned on, and is then later subtracted from the total current $I_T$ when the laser chip 25 is turned on. It should also be noted that the load current $I_R$ is also subtracted and removed in the same action. The resulting current input to the transimpedance amplifier A2 is now only dependent on the amount of laser light that is received by the monitor photodiode 26. Thus, any possible corruption of the main photodiode current $I_M$ caused by the photodiode leakage current $I_L$ due to the forward biasing of the monitor photodiode 26 is obviated. Low cost lasers in current manufacture from multiple sources, even from other industries, can now be used.

Figure 6:
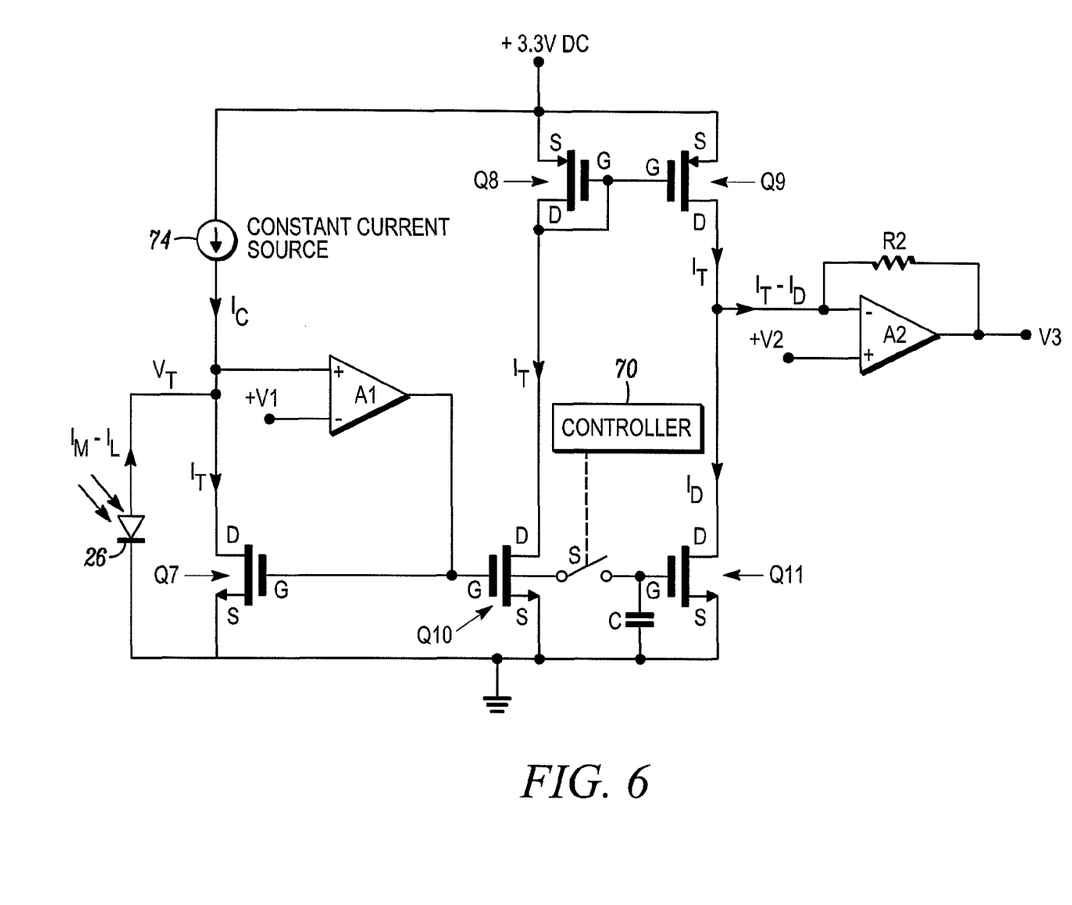
FIG. 6 is an electrical circuit schematic of another embodiment of an arrangement and method of controlling the laser of FIG. 3 in accordance with the present invention.

FIG. 6 depicts another embodiment of signal processing circuit, in which like parts have been identified with like numerals. MOSFET Q7 is connected across the monitor photodiode 26. A constant current source 74 insures a minimum bias current to pass through MOSFET Q7 in the deenergized state (when the main photodiode current $I_M$ is zero).

In operation, when the switch S is closed in the track mode during the deenergized state, $I_T = I_D = (I_C - I_L)$. Thereupon, when the switch S is open in the hold mode during the energized state, $I_T = (I_C - I_L) + I_M$. Since $I_D = (I_C - I_L)$, then $(I_T - I_D) = I_M$. As before, a fixed voltage bias is placed across the monitor photodiode to hold the photodiode leakage current substantially constant, even in the presence of incident light. The photodiode leakage current is then removed by the signal processor.

It will be understood that each of the elements described above, or two or more together, also may find a useful application in other types of constructions differing from the types described above.

While the invention has been illustrated and described as embodied in laser power control arrangements in electro-optical readers, it is not intended to be limited to the details shown, since various modifications and structural changes may be made without departing in any way from the spirit of the present invention. Although described in connection with readers, the laser control arrangements of this invention can equally well be applied to laser projection displays and, in general, any system in which a laser is used.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for controlling a laser that has an internal semiconductor laser chip and an internal semiconductor monitor photodiode, in an electro-optical reader for reading indicia, comprising:
    a controller for deenergizing the laser chip in a deenergized state, and for energizing the laser chip to emit a laser beam with an output power in an energized state;
    a positive voltage power supply connected to an anode of the monitor photodiode, for forward biasing the monitor photodiode at a substantially constant positive voltage below a threshold voltage of the monitor photodiode, and for maintaining said substantially constant positive voltage at the anode to support a substantially constant photodiode leakage current in both states; and
    a signal processor for supporting a total current comprised of a main photodiode current indicative of the output power of the laser beam in the energized state and of the substantially constant photodiode leakage current which flows opposite to the main photodiode current, and for removing the substantially constant photodiode leakage current from the total current to output only the main photodiode current in the energized state.

2. The arrangement of claim 1, wherein the positive voltage power supply includes an input operational amplifier and a metal oxide semiconductor field-effect transistor (MOSFET).

3. The arrangement of claim 1, wherein the signal processor includes a track-and-hold circuit for holding a held current indicative of the photodiode leakage current in the energized state.

4. The arrangement of claim 3, wherein the track-and-hold circuit includes a switch under control of the controller and switchable between a hold mode in which the switch is closed in the deenergized state, and a track mode in which the switch is open in the energized state.

5. The arrangement of claim 4, wherein the track-and-hold circuit also includes a capacitor for holding the held current in the track mode.

6. The arrangement of claim 1, wherein the signal processor includes a plurality of current mirrors each operative for generating the total current.

7. The arrangement of claim 1, wherein the signal processor also includes an output operational amplifier for converting the main photodiode current to an output voltage.

8. The arrangement of claim 1, wherein the laser is a scanning laser in which the laser beam is moved by the reader across the indicia during reading.

9. The arrangement of claim 1, wherein the laser is an aiming laser in which the laser beam is directed in an aiming pattern at the indicia prior to reading.

10. A method of controlling a laser that has an internal semiconductor laser chip and an internal semiconductor monitor photodiode, in an electro-optical reader for reading indicia, comprising the steps of:
deenergizing the laser chip in a deenergized state, and energizing the laser chip to emit a laser beam with an output power in an energized state;
forward biasing the monitor photodiode at a substantially constant positive voltage below a threshold voltage of the monitor photodiode by connecting a positive voltage power supply to an anode of the monitor photodiode, and maintaining said substantially constant positive voltage at the anode to support a substantially constant photodiode leakage current in both states;
supporting a total current comprised of a main photodiode current indicative of the output power of the laser beam in the energized state and of the substantially constant photodiode leakage current which flows opposite to the main photodiode current; and
removing the substantially constant photodiode leakage current from the total current to output only the main photodiode current in the energized state.

11. The method of claim 10, and holding a held current indicative of the photodiode leakage current in the energized state.

12. The method of claim 11, wherein the holding step is performed by switching a switch between a hold mode in which the switch is closed in the deenergized state, and a track mode in which the switch is open in the energized state.

13. The method of claim 12, wherein the holding step is performed by holding the held current in the track mode.

14. The method of claim 10, and generating the total current with multiple current minors.

15. The method of claim 10, and converting the main photodiode current to an output voltage.

16. The method of claim 10, and scanning the laser beam across the indicia during reading.

17. The method of claim 10, and aiming the laser beam in an aiming pattern at the indicia prior to reading.

* * * * *

UNITED STATES PATENT AND TRADEMARK OFFICE
CERTIFICATE OF CORRECTION

| | | |
|---|---|---|
| PATENT NO. | : 8,167,208 B2 | Page 1 of 1 |
| APPLICATION NO. | : 12/821436 | |
| DATED | : May 1, 2012 | |
| INVENTOR(S) | : Weitzner et al. | |

It is certified that error appears in the above-identified patent and that said Letters Patent is hereby corrected as shown below:

In Column 3, Line 35, delete "state The" and insert -- state. The --, therefor.

In Column 7, Line 18, delete "minor" and insert -- mirror --, therefor.

In Column 10, Line 23, in Claim 14, delete "minors." and insert -- mirrors. --, therefor.

Signed and Sealed this
Eighth Day of January, 2013

David J. Kappos
*Director of the United States Patent and Trademark Office*